Aug. 12, 1958    H. F. MALONE ET AL    2,846,823
KNIFE HONING MACHINE FOR SWEET CORN CUTTERS
Filed Aug. 21, 1952    4 Sheets-Sheet 1
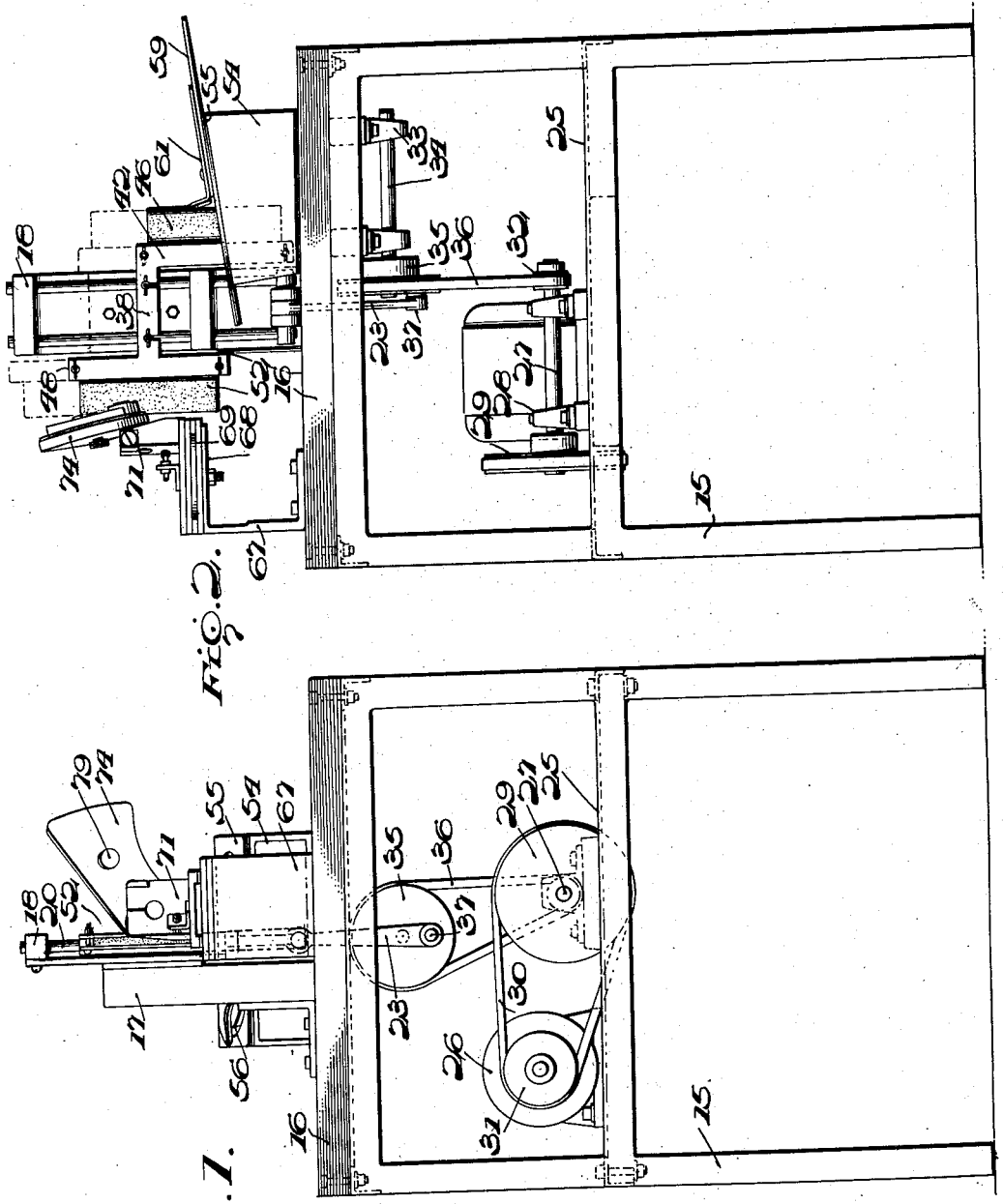
INVENTORS
H. F. Malone
V. M. Krause
BY
ATTORNEYS

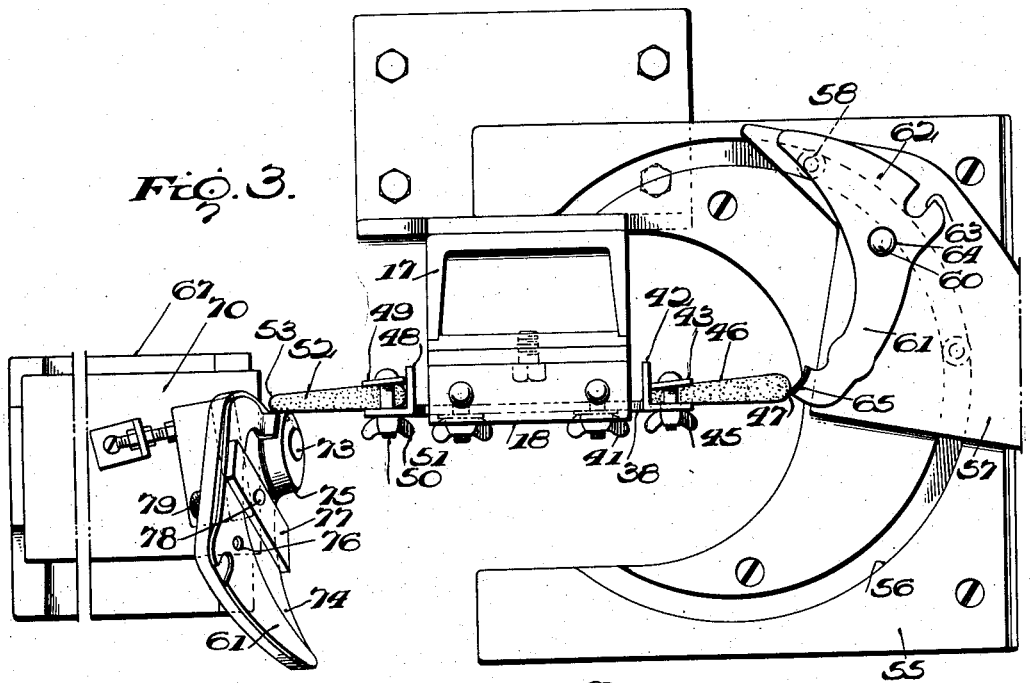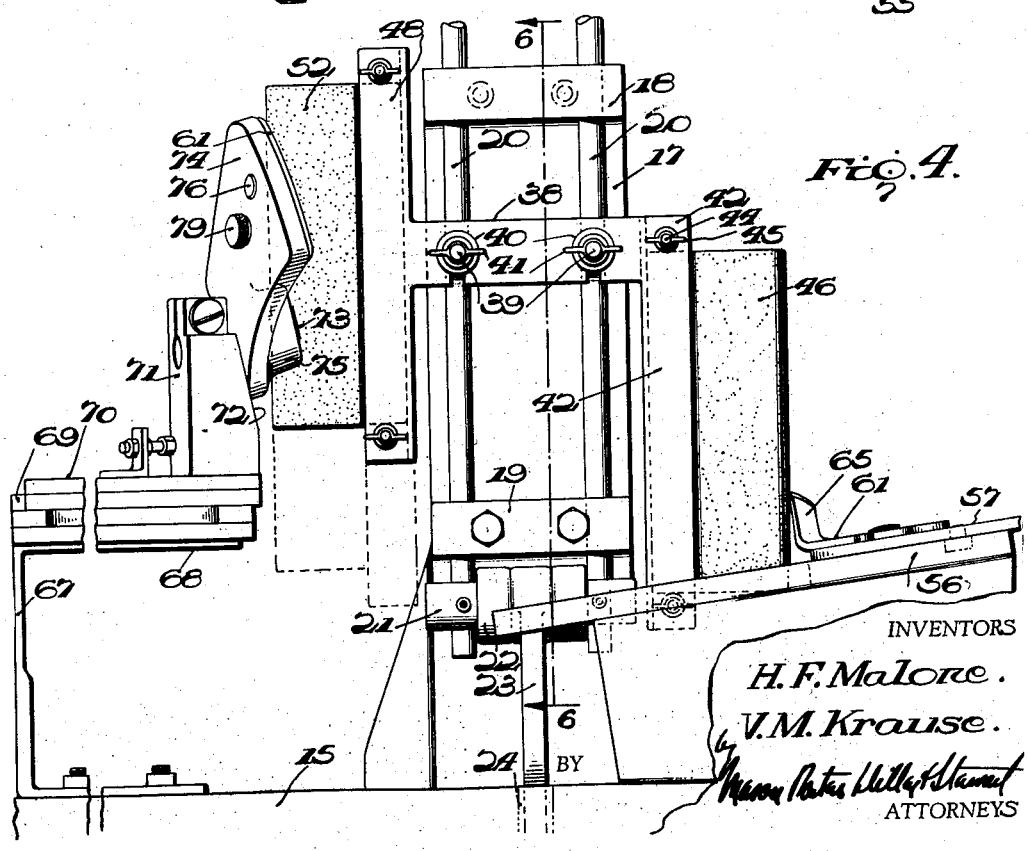

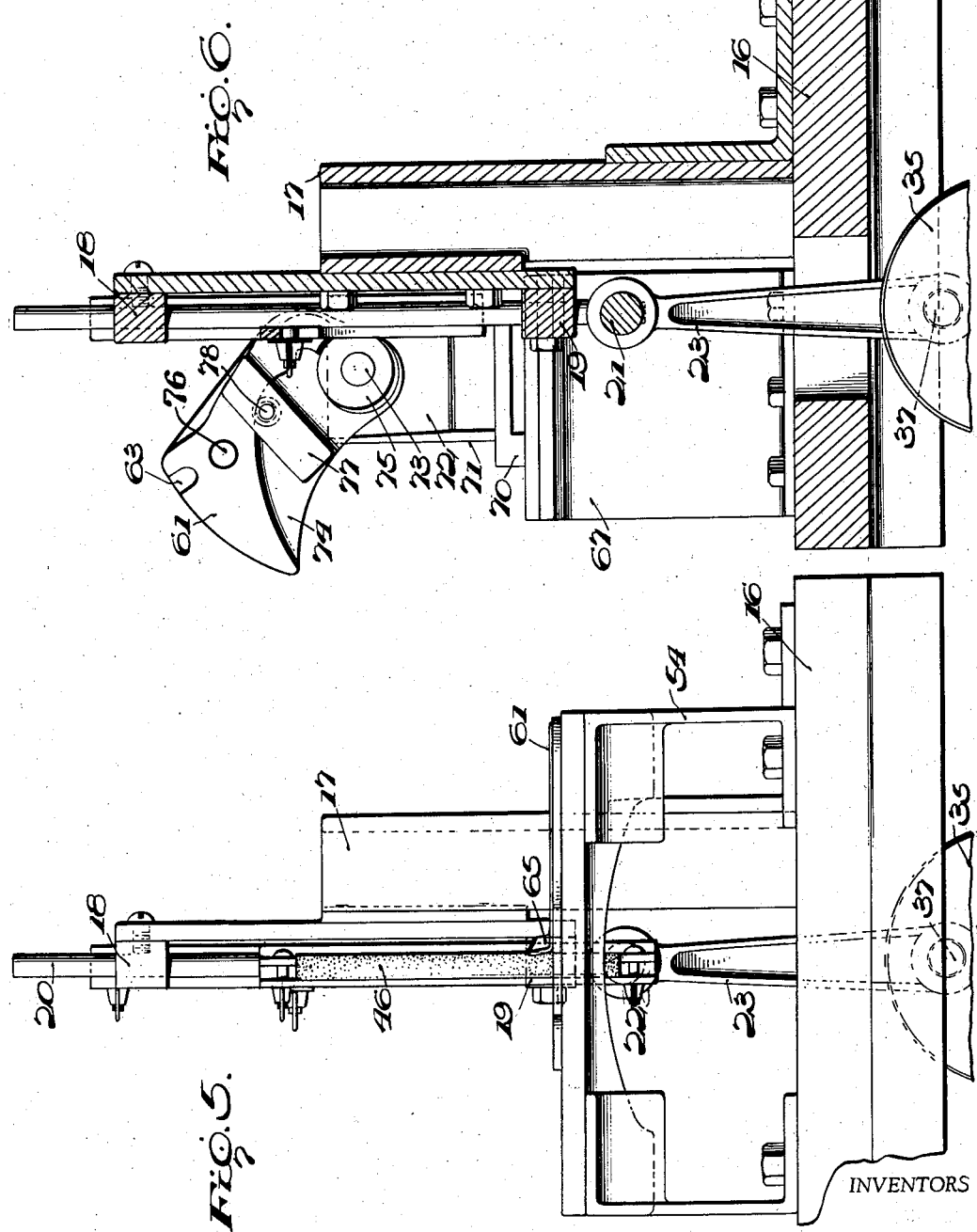

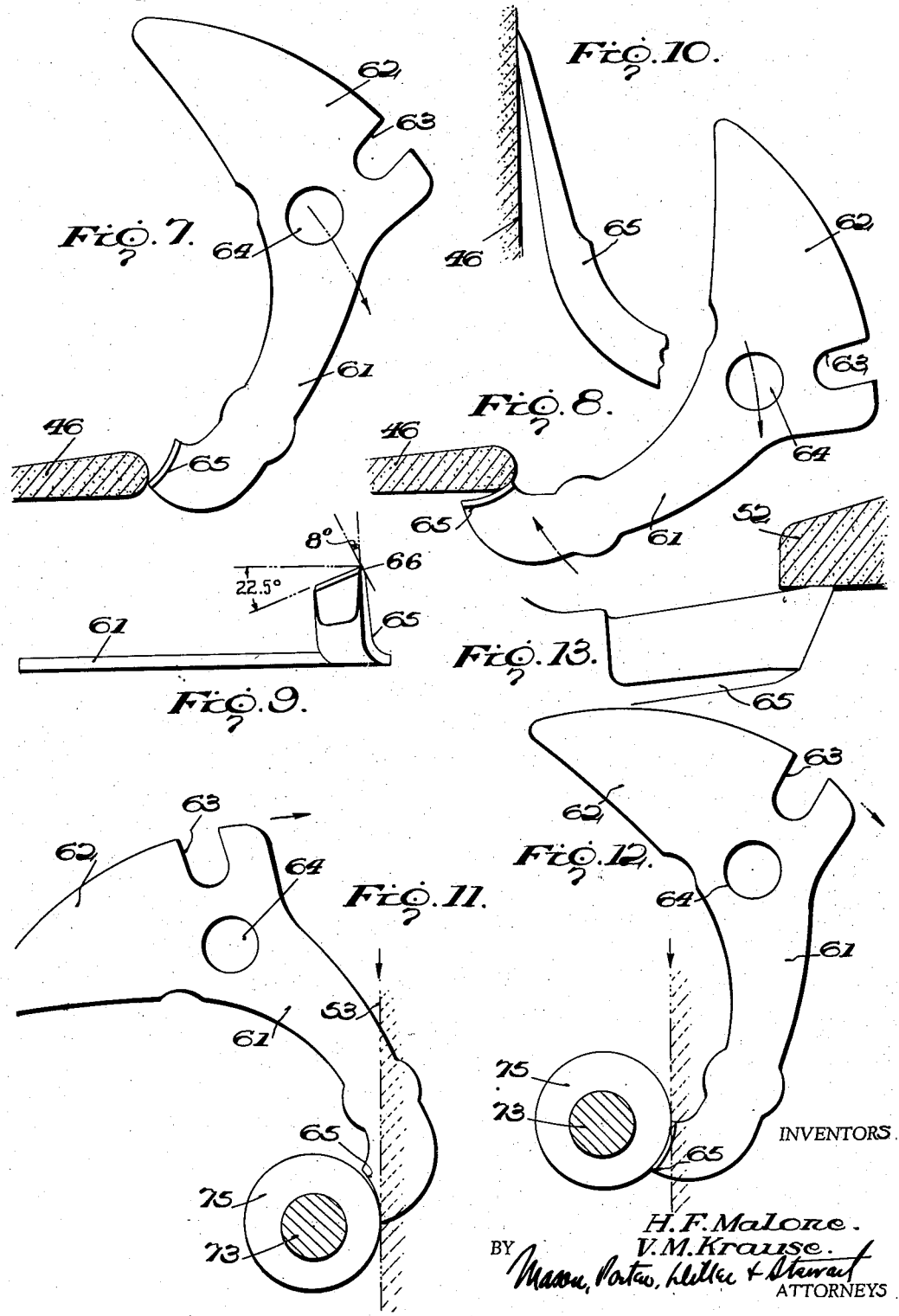

United States Patent Office 2,846,823
Patented Aug. 12, 1958

2,846,823

KNIFE HONING MACHINE FOR SWEET CORN CUTTERS

Harry F. Malone and Vern M. Krause, Le Sueur, Minn., assignors to Green Giant Company, Le Sueur, Minn., a corporation of Minnesota Application August 21, 1952, Serial No. 305,662

1 Claim. (Cl. 51—65)

The following specification relates to improvements in knife honing machines for sweet corn cutters. Six of such cutter knives are used in a corn cutting machine simultaneously and serve to cut the kernels from the cob in a single traverse of the latter. A satisfactory, smooth, clean cut of the corn requires that each of these knives be kept razor-sharp at all times. It is common practice to remove a set of knives frequently during a day's run, and to re-hone each knife to restore its edge. Even with the provision of extra sets of replacement knives, time is lost by the interruption necessitated in changing the mounting for the new set. Even more important is the time required to re-hone each knife by hand.

The standard design for the individual knives requires that the cutting edge be maintained at an angle of 22½ degrees from the horizontal, and that the cutting edge be beveled on the inside, at an angle of eight degrees for 1/32" width throughout the length of the cutting edge.

The back side of the knife is maintained flat with no bevel and honed to a point just before the edge begins to turn over.

Customarily, the individual knives are removed from the corn cutters and honed by hand, the operator using guides and jigs to maintain the proper angles above indicated. However, manual honing always results in slight differences between the individual knives of a set. The operation also requires great skill and necessarily considerable time.

It is the object of our invention to provide a honing machine in which the cutter knives may be restored to sharpness much faster than by hand, and with the assurance that all knives of the same set will possess the same dimensions and proportions.

One of the objects of our invention is to provide a machine which shall be small and portable to accomplish the results desired.

A further object of the invention is to provide a common mounting by which the individual knives may be honed on both sides of the cutting edges with a degree of unformity and accuracy exceeding that of manual labor.

Other objects of the invention will be apparent from the following description of the preferred form of the invention as illustrated in the accompanying drawings in which:

Figure 1 is an end view in elevation of the improved knife honing machine;

Figure 2 is a side elevation of the same;

Figure 3 is a plan view of the machine;

Figure 4 is an enlarged side elevation of the mountings for the hones and the cutter knives;

Figure 5 is an enlarged end elevation in a direction opposite to Figure 1;

Figure 6 is an enlarged vertical section on the line 6—6 of Figure 4;

Figure 7 is a side view of the cutter knife and the hone at the commencement of the first honing operation;

Figure 8 is a similar view at the completion of the operation;

Figure 9 is a side view of the cutting blade;

Figure 10 is an enlarged fragmentary side view of the blade and hone;

Figure 11 is a side view of the knife and hone at the commencement of the second or back honing operation;

Figure 12 is a side view of the same at the completion of the second operation and Figure 13 is an enlarged fragmentary side view of the blade and hone during this second operation.

Briefly stated the improved honing machine consists of a power-driven carriage for rapidly reciprocating two separate hones vertically opposite the work holders. The work holders carry the knives in a proper angular position opposite the hones so that every knife may be operated upon successively by each hone to the extent found desirable by the operator.

The machine is mounted upon a portable table 15. This table has a top 16 on which is mounted a fixed standard 17. A transverse slide bearing guide 18 is bolted across the top of the standard 17, while a corresponding transverse slide bearing guide 19 is bolted across the lower part of the standard 17. These guides carry sliding rods 20, 20 freely movable vertically in the guides 18 and 19.

The lower ends of the rods 20, 20 are connected by a transverse wrist pin 21. The wrist pin carries a collar 22 which forms a journal for the upper end of a connecting rod 23. This connecting rod 23 travels loosely in a slot 24 in the top 16 of the table.

Below the top 16 of the table there is a shelf 25 on which is mounted an electric motor 26. A countershaft 27 is journaled in self-aligned bearings 28, 28 on the shelf parallel to the shaft of the motor. Countershaft 27 carries a pulley 29 which is driven by a V-belt 30 from a similar pulley 31 on the motor.

A smaller pulley 32 is provided on the opposite end of the countershaft 27.

The undersurface of the top 16 carries a pair of self-aligned bearings 33 in which there is journaled a second countershaft 34 parallel to shaft 27. One end of the countershaft 34 above, and in the same plane with pulley 32, is provided with a larger pulley 35. Pulleys 32 and 35 are connected operatively by a V-belt 36.

The outer face of pulley 35 has an eccentric pin 37 substantially in the same vertical plane with the collar 22 on wrist pin 21. The connecting rod 23 is journaled on the collar 22 and on the eccentric pin 37.

By this means the speed of the motor is reduced suitably and power is delivered to the connecting rod so that the slide rods 20, 20 may be reciprocated at the desired speed.

As the main purpose of the belt drive is to reduce speed, it is feasible to use any other suitable gear reduction.

The sliding rods 20, 20 form part of a carrier for the hones. This carrier includes a horizontal cross bar 38 having transverse slots to receive a pair of studs 39 on the sliding rods 20, 20, and these studs are screw threaded to carry washers 40 and wing nuts 41. In this way the crossbar 38 becomes a part of the vertically reciprocating carrier. At the same time the crossbar and its attachments may be readily removed for adjusting or replacing the hones.

The carrier supports a hone on each side. Thus one side of the carrier 38 has a lower jaw 42 extending below the crossbar for a considerable distance. This jaw has a spaced parallel clamping bar 43 which is held by bolts 44 passing through the opposite ends of the jaw 42 and clamped thereto by means of wing nuts 45. The lower stone 46 is thus held by the clamp bar 43 against the lower jaw 42.

This lower stone has its circular edge 47 presented outwardly as the working surface.

The opposite end of the cross bar 38 has an upper jaw 48. This jaw 48 carries a loose clamp bar 49 by means of bolts 50 running through the upper jaw and drawn up by means of wing nuts 51.

The upper stone 52 is clamped between the clamp bar 49 and the upper jaw 48 in the manner shown in Fig. 3. Thus it has its curved edge 53 presented as the working surface as the hone is reciprocated vertically.

Reciprocation of the connecting rod 23 will cause the stones to rise and fall rapidly.

Opposite the stone 46 the table carries a jig 54 bolted thereon. This jig is provided with a top 55 at an inclination of 8 degrees from the horizontal. Thus the top 55 may be said to slope downwardly toward the carrier at an angle of 8 degrees. The top 55 has a circular groove 56 which is substantially concentric with the leading edge of the lower stone 46.

A knife holder 57 is mounted on studs 58 which travel in groove 56. The holder is therefore constrained to move in a circular path around the stone 46. The holder 57 has an operating handle 59 by which the knife holder may be rotated as desired around the stone 46. The upper face of the holder 57 carries a stud 60.

As shown in Fig. 3, the individual knives 61 each consists of a rear sector 62 having a recess 63 and a hole 64 inwardly of the latter. The forward arm of the knife 61 is bent upwardly substantially at right angles to the remainder of the knife and forms a blade 65.

This blade 65 is supplied originally with its inner side ground to provide a slight concave curvature. As shown in Fig. 9 the blade is sloped laterally at an angle of 22½ degrees.

The honing operation accomplished by the lower stone 46 is to provide a bevel 66 of 8 degrees on the front or concave face of the blade for a width of substantially $\frac{1}{32}$".

Opposite the jig 54, the table is provided with a work bracket 67. This bracket has a bed plate 68 provided with a guide rail 69. This rail extends inwardly toward the carrier 38 (see Figs. 3 and 4).

The rail 69 supports a slide 70 which has a standard 71. The front of this standard has an inclined face 72. The face is provided with a pivot 73 whose axis inclines upward and toward the hone 52, and on which is mounted a knife holder 74. This knife holder has a hub 75 loosely mounted upon the pivot 73.

The front face of the knife holder 74 also has a stud 76 to fit in the hole 64 of the knife 61. A clamp bar 77 is carried loosely on a bolt 78 which runs through the knife holder 74 and on the rear has an adjusting nut 79.

The knife 61 is fitted on the face of the knife holder 74, on the stud 76 and held tightly by the clamp bar 77, as shown in Fig. 3.

This brings the outer or convex face of the blade opposite the curved edge 53 of the upper hone 52.

The knife holder 74 may then be easily manipulated to bring the convex side of the knife blade within the path of movement of the stone so that the convex surface may be honed down to the sharpness desired.

In the operation of the machine, the knife 61 is preferably fastened with a friction fit over the stud 60 on the knife holder 57. The hone carrier is put in vertical movement and rapidly reciprocated by the motor.

The knife holder 57 is caused to traverse the jig 54. At the same time, the blade 65 is moved up with its concave face opposite the rounded, leading edge of the stone 46.

The stone will rub against the concave face of the knife blade 65 with a reciprocating movement. By observation the operator will be able to hone down the edge of the blade 65 until the desired width of $\frac{1}{32}$" is produced. At the same, the relative positions of the jig inclined with respect to the vertical, will give a uniform slope to the ground surface of each knife blade which is treated.

The knife may then be moved from the knife holder 57 and then mounted upon the stud 76 of the opposite knife holder 74. After the knife is locked into position on the knife holder 74 by means of the clamp bar 77, the slide 70 is advanced toward the upper hone, thus bringing the convex surface of the knife blade into contact with the side of the hone adjacent the curved edge. The knife holder 74 is then rocked about the axis of the pivot 73, to present the convex surface of the knife blade 65 to the hone throughout the length of the cutting edge of the blade. Vertical reciprocation of the carrier moves the hone across the convex side of the blade 65 in a motion very similar to that of manual filing. The convex side of the blade 65 is thus accurately ground down until the cutting edge is sharpened without, however, producing a wire edge.

In both honing operations it is understood that the dressing of the edge may be accomplished by the use of coarse stones in the beginning, followed by finer stones.

In following the above procedure, the angularity of grinding is entirely controlled by the positions of the jigs and work holders. These angular relationships can be predetermined or adjusted to suit particular conditions.

The operator needs only determine from observation when the sharpening has been carried to the desired extent.

With the machine as described, great uniformity will be found in the work done on the knives. Thus all knives of any definite set will have uniform cutting edges both in respect to bevel and the extent of sharpening.

The invention has been described for using the mechanism of the preferred example. However, the principle of the invention may be embodied in other forms and numerous variations made in proportions and material without departing from the scope of the invention as defined in the following claim.

What we claim is:

A machine for sharpening a knife including an arm having a concave face terminating in an arcuate cutting edge, said sharpening machine comprising a knife holder, means mounting said knife holder for movement in an arcuate path about a predetermined axis, means for mounting the knife on the holder with the concave face of the knife arm spaced from and facing toward said axis, an elongated sharpening tool having a longitudinally straight and transversely curved convex working surface, said working surface being positioned between said axis and said cutting edge, means mounting the tool for endwise rectilinear reciprocation in a direction inclined to said axis with the working surface of the tool in engagement with the concave face of the knife arm adjacent the cutting edge, means for reciprocating the sharpening tool in said direction, and means for moving the knife holder in said arcuate path about said axis during engagement of the knife arm with the reciprocating sharpening tool.

References Cited in the file of this patent

UNITED STATES PATENTS

| 107,896 | Fowler | Oct. 4, 1870 |
|---|---|---|
| 414,408 | Hatteberg | Nov. 5, 1889 |
| 438,581 | Hastings | Oct. 14, 1890 |
| 490,930 | Stanbrough | Jan. 21, 1893 |
| 944,678 | La Hodny | Dec. 28, 1909 |
| 1,100,360 | Elick | June 16, 1914 |
| 1,351,290 | Greenleaf | Aug. 31, 1920 |
| 1,476,265 | Matthews | Dec. 4, 1923 |
| 1,509,836 | Haldeman et al. | Sept. 30, 1924 |
| 1,625,049 | Oliver | Apr. 19, 1927 |
| 2,107,921 | Weed | Feb. 8, 1938 |
| 2,452,697 | Stabler | Nov. 2, 1948 |
| 2,510,557 | Cover | June 6, 1950 |
| 2,519,351 | Calvert | Aug. 22, 1950 |

FOREIGN PATENTS

| 565,284 | Great Britain | Nov. 3, 1944 |
|---|---|---|
| 651,494 | Great Britain | Aug. 20, 1948 |